US008069053B2

(12) United States Patent
Gervais et al.

(10) Patent No.: US 8,069,053 B2
(45) Date of Patent: Nov. 29, 2011

(54) SYSTEMS AND METHODS FOR DE-IDENTIFICATION OF PERSONAL DATA

(75) Inventors: Thomas J. Gervais, West Hartford, CT (US); Robert M. Siragusa, Columbia, CT (US); Prasanna V. Sundaram, Rocky Hill, CT (US); Joan L. Knighton, Bloomfield, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 473 days.

(21) Appl. No.: 12/190,915

(22) Filed: Aug. 13, 2008

(65) Prior Publication Data
US 2010/0042583 A1 Feb. 18, 2010

(51) Int. Cl.
G06Q 10/00 (2006.01)

(52) U.S. Cl. ......... 705/1.1; 707/721; 707/741; 707/781; 707/803

(58) Field of Classification Search ............ 707/721, 707/741, 781, 803; 705/1.1; 713/165; 726/1, 726/21, 4
See application file for complete search history.

(56) References Cited

U.S. PATENT DOCUMENTS

| 7,158,979 B2 | 1/2007 | Iverson et al. | |
| 7,475,085 B2* | 1/2009 | Aggarwal et al. | 1/1 |
| 2001/0054155 A1* | 12/2001 | Hagan et al. | 713/193 |
| 2002/0073099 A1 | 6/2002 | Gilbert et al. | |
| 2003/0220927 A1* | 11/2003 | Iverson et al. | 707/100 |
| 2005/0165623 A1 | 7/2005 | Landi et al. | |
| 2006/0020611 A1 | 1/2006 | Gilbert et al. | |
| 2006/0100990 A1* | 5/2006 | Aaron | 707/3 |
| 2007/0081428 A1* | 4/2007 | Malhotra et al. | 369/25.01 |
| 2007/0255704 A1 | 11/2007 | Baek et al. | |
| 2008/0275829 A1* | 11/2008 | Stull et al. | 706/17 |
| 2008/0301130 A1* | 12/2008 | Fontoura et al. | 707/5 |

OTHER PUBLICATIONS

Shen et al., Privacy Protection in Personalized Search, ACM SIGIR Forum, vol. 41, No. 1, Jun. 2007, pp. 4-17.*
Ishna Neamatullah et al., "Automated De-Identification of Free-Text Medical Records", BMC Medical Informatics and Decision Making 2008, 8:32, D01:10.1186/1472-6947-8-32, (cover 1pg. + pp. 1-52 + figures 1pg + reference 1pg., total 55 pages).

* cited by examiner

Primary Examiner — Cheyne Ly
(74) Attorney, Agent, or Firm — Buckley, Maschoff & Talwalkar LLC

(57) ABSTRACT

According to some embodiments, original data is retrieved from an original data source. The original data may be automatically searched for potential personal information, such as a person's name, address, or Social Security number. An obfuscation method may be selected from a plurality of potential obfuscation methods. The potential personal information in the original data may then be automatically replaced with fictional data in accordance with the selected obfuscation method.

23 Claims, 14 Drawing Sheets

FIG. 12

SYSTEMS AND METHODS FOR DE-IDENTIFICATION OF PERSONAL DATA

BACKGROUND

An enterprise may store information about other entities, such as people (e.g., customers, patients, employees, or insurance policy holders) and/or other companies, in order to process transactions during the normal course of business. Moreover, some of the stored information might be considered "personal information," such as for example, a person's name, home address, email address, telephone number, credit card number, or Social Security number. Note that a person might expect that the enterprise would not let his or her personal information be accessed by anyone who does not need the information in order to process the transaction. As a result, an enterprise will generally attempt to restrict access to personal information to protect the privacy of the entities (e.g., customers) and reduce the likelihood of identity theft and similar abuses.

In addition, certain types of personal information are protected by governmental requirements that dictate how particular items of information must be handled. For example, Personally Identifiable Information (PII) and/or Personal Health Information (PHI) as defined in various US governmental regulations must be protected in accordance with specific sets of rules. Note that other countries or regions (e.g., the European Union or Japan) might have similar laws and/or rules.

In some cases, an enterprise may use one or more automated programs or applications that access information, including personal information, from data stores (e.g., databases). For example, an enterprise might have a billing application that accesses a customer's name and home address from a data store in order to mail a billing statement to the customer's home.

Note that an enterprise might want to use information from a data store, including types of information that may be considered personal, even when the information is not needed to complete an actual transaction with a customer. By way of example, it might be helpful to share such information with a team of system designers who are developing and/or testing a new or updated version of an application.

To avoid disclosing any personal information associated with actual customers, an enterprise could create an entirely fictitious or fictional data store. Such an approach may be impractical, however, when an application needs to be tested with relatively large data stores (e.g., databases that contain information about tens of thousands of entities). Moreover, generating complicated data stores that mimic actual data stores can be a difficult and expensive process. For example, many different data stores—each establishing different relationships between elements within and between those data stores—might need to be created and tested.

As another approach, an actual data store could be manually reviewed to locate data that might be considered personal information and/or such data could be manually deleted or replaced with different information. These actions, however, can be time consuming, error prone, and difficult to administer in a cost effective basis, especially when a substantial number of database elements are involved.

BRIEF DESCRIPTION OF THE DRAWINGS

FIGS. 8 through 12 illustrate graphical user interface displays that may be associated with a data de-identification service in accordance with an exemplary embodiment of the present invention.

SUMMARY OF THE INVENTION

According to some embodiments, original data is retrieved from an original data source. The original data is automatically searched for potential personal information. An obfuscation method is selected from a plurality of potential obfuscation methods, the potential personal information in the original data is automatically replaced with fictional data in accordance with the selected obfuscation method.

Other embodiments include: means for receiving original data from a data source; means for automatically creating an inventory of elements in the original data; means for searching the elements in the inventory for potential personal information; means for selecting an obfuscation method from a plurality of potential obfuscation methods; and means for automatically replacing the potential personal information in the original data with fictional data in accordance with the selected obfuscation method.

In some embodiments, original data is received from a data store, and metadata data associated with the original data is analyzed to create an inventory of elements in the original data. The elements in the inventory may then be searched for potential personal information based on at least one character matching rule. An obfuscation rule may be evaluated, and scripts may be automatically created. The scripts may, for example, be used during a database refresh process to replace the potential personal information in the original data with fictional data in accordance with (i) a result of said evaluation and (ii) an obfuscation method selected from a set of potential obfuscation methods.

A technical effect of some embodiments of the invention is an automated protection of personal information in databases. With this and other advantages and features that will become hereinafter apparent, a more complete understanding of the nature of the invention can be obtained by referring to the following detailed description and to the drawings appended hereto.

DETAILED DESCRIPTION

Figure 1:
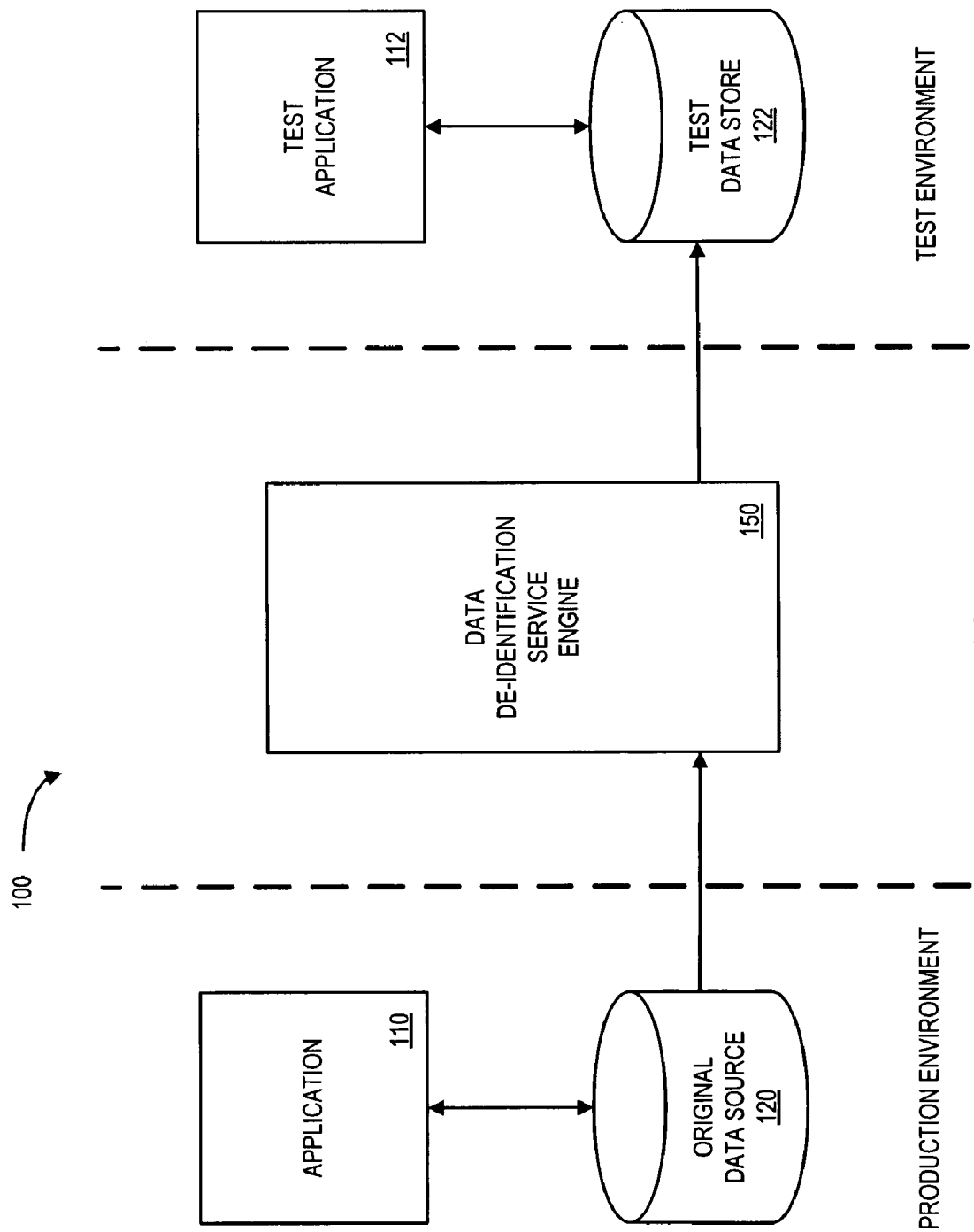
FIG. 1 is block diagram of a system according to some embodiments of the present invention.

An enterprise may store information about other entities, such as people (e.g., customers, patients, employees, or insurance policy holders) or other companies, in order to process transactions during the normal course of business. By way of example, FIG. 1 is block diagram of a system 100 that stores information in an original data source 120 according to some embodiments of the present invention.

Figure 2:
FIG. 2 is a tabular view of a portion of an original data source in accordance with some embodiments of the present invention.

Some of information in the original data source 120 might include "personal information," such as a person's name, home address, telephone number, credit card number, or Social Security number. By way of example only, FIG. 2 is a tabular view of an original data source 200 in accordance with some embodiments of the present invention. This table illustrates entries associated with actual insurance claims that have been submitted to an enterprise. The table also defines fields 202, 204, 206, 208, 210 for each of the entries. The fields specify: a data source identifier 202, a name 204, a claim amount 206, a policy identifier 208, and a claim status 210. The information in the database 200 may be created and updated based on information received from insurance brokers, policy holders, and/or claim processing devices. Although insurance-related information is described herein in some examples, note that embodiments may be associated with any other types of information (e.g., demographic or financial information).

The data source identifier 202 may be, for example, an alphanumeric code associated with an insurance policy claim (e.g., a claim number), and the name 204 may represent the name of the person (or other entity) who submitted the claim. The claim amount 206 may represent the dollar value of the claim, and the policy number 208 may indicate an insurance policy number under which the claim is being submitted. The claim status 210 might indicate, for example, that the claim has been "approved," is currently "pending," and/or that the claim has been "denied."

Note that some of the information in the original data source 200 may represent personal information. For example, the person's name 204 and the policy identifier 208 might be considered personal information. Other information in the original data source 200 might not be considered personal information. For example, the claim amount 206, by itself, might not be considered personal information.

Note that the original data source 200 may store and/or be associated with information in addition to the information illustrated in FIG. 2. For example, attribute and/or inventory information may indicate a data type, such as a Binary Large Object (BLOB) data type or a Variable Character (VARCHAR) field data type. In addition, the information in the original data source 200 might be associated with data lengths, constraints, row counts, row sizes, indexes, triggers, and/or null values.

Referring again to the system 100 of FIG. 1, an application 110 may store information, including personal information associated with actual people, into the original data source 120 during the normal course of business (e.g., by creating a new entry whenever an insurance claim is received from an actual policy holder). The application 110 may also retrieve information from, and update information in, the original data source 120 (e.g., when an insurance claim is processed and approved during the normal course of business).

The information in the original data source 120, including any personal information, may be received from entities in a number of different ways. For example, people might provide insurance-related information from remote devices (not illustrated in FIG. 1) via a communication network. The remote devices 112 could comprise, for example, telephones, facsimile machines, email servers, and/or web browsers. According to some embodiments, people might also send documents, including personal information, to the system 100 via postal mail or any other document delivery system.

Note that a person might expect that the enterprise will prevent his or her personal information from being accessed for any reason other than the normal processing of a transaction. As a result, an enterprise will generally attempt to restrict access to personal information in the original data source 120 to protect the privacy of the entities (e.g., customers) and reduce the likelihood of identity theft or other abuses. In addition, some PII and PHI values may need to be protected in order to comply with applicable governmental requirements. Note that although PII and PHI types of personal information are used herein as examples, embodiments might be associated with any other type of personal information or non-personal information. For example, all dates (including birth dates) might be increased by two years or the dollar amount of all 401(K) contributions might be increased by $100 for modeling purposes. Moreover, embodiments are not limited to numerical values and/or character strings. For example, some embodiments might be associated with images (e.g., a passport photograph), audio information, and/or biometric data (e.g., associated with a fingerprint).

In some cases, an enterprise may utilize one or more automated applications 110 that access information in the original data source 120. For example, an enterprise might have a billing application that accesses a customer's name and home address from a data store in order to mail a billing statement to the customer's home. That is, the application 110 may retrieve information from, and store information into, the original data source 120 in a "production" environment during the normal course of business.

Note that it might be beneficial for the enterprise to allow access to information in the original data store 120, including personal information, even when the information is not needed to process a transaction with a customer. By way of example, a team of system designers working in a test and/or development environment may be creating a test application 112 that incorporates new or improved functions for the production application 110. In order to efficiently test (e.g., debug) and/or develop the test application 112, it may be helpful to have the test application 112 retrieve and store information about entities in a way similar to the way in which the production application 110 accesses the original data source 120.

Thus, the test application 112 could be permitted to access the original data source 120 (or an exact copy of the original data source 120), including the personal information stored therein. However, such an approach might fail to meet the expectations of customers who provided the information and/or violate governmental regulations.

To avoid such a result, some embodiments of the present invention provide a data de-identification service engine 150. The data de-identification service engine 150 might, for example, generate a test data store 122 based on information in the original data source 120. The test data store 122 might include similar information, formatted in a similar way, as the original data source 120 without including, for example, any actual PIT or PHI values (or other types of information) that were included in the original data source 120. In this way, the test application 112 can store information into and/or retrieve information from the test data store 122 in the testing and/or development environment without violating customer expectations or governmental regulations. According to other embodiments, the data de-identification service engine 150 might instead re-write "scrubbed" data back into the original data source 120 and/or use a copy of the original data source 120 and/or the test data store 122.

As used herein, data "de-identification" may refer to, for example, data sanitization, data obfuscation, data masking, and/or other techniques wherein data and/or characters are replaced (e.g., modifying existing data so as to remove identifiable characteristics and render the data anonymous, while still maintaining the format and usefulness of the data).

Note that any of the elements of the system 100 might be associated with a server, a Personal Computer (PC), a portable computing device such as a Personal Digital Assistant (PDA), or any other appropriate storage and/or communication device to exchange information (e.g., via a web site and/or a communication network). As used herein, devices (including the application 110 and other elements of the system 100) may exchange information via any communication network, such as a Local Area Network (LAN), a Metropolitan Area Network (MAN), a Wide Area Network (WAN), a proprietary network, a Public Switched Telephone Network (PSTN), a Wireless Application Protocol (WAP) network, a Bluetooth network, a wireless LAN network, and/or an Internet Protocol (IP) network such as the Internet, an intranet, or an extranet. Note that any devices described herein may communicate via one or more such communication networks.

Although a single application 110, original data source 120, test application 112, test data store 122, and data de-identification service engine 150 are illustrated in FIG. 1, any number of such devices may be included. Similarly, any of the devices described herein may be split and/or combined according to embodiments of the present invention. For example, in some embodiments, the application 110 and original data source 120 might be co-located and/or may comprise a single apparatus.

The original data source 120 and/or test data store 122 (as well as any of the other data storage units described herein) may utilize any type of scheme or protocol to store information. By way of example only, information might be stored in connection with: an ORACLE® database type, a Microsoft® (MS) SQL server database type, an IBM® Database 2 (DB2) database type, an MS Access database type, and/or the open source MYSQL database type. According to some embodiments, information that passes through a .NET network or flows through an Extract/Transfer/Load (ETL) application may be processed.

Figure 3:
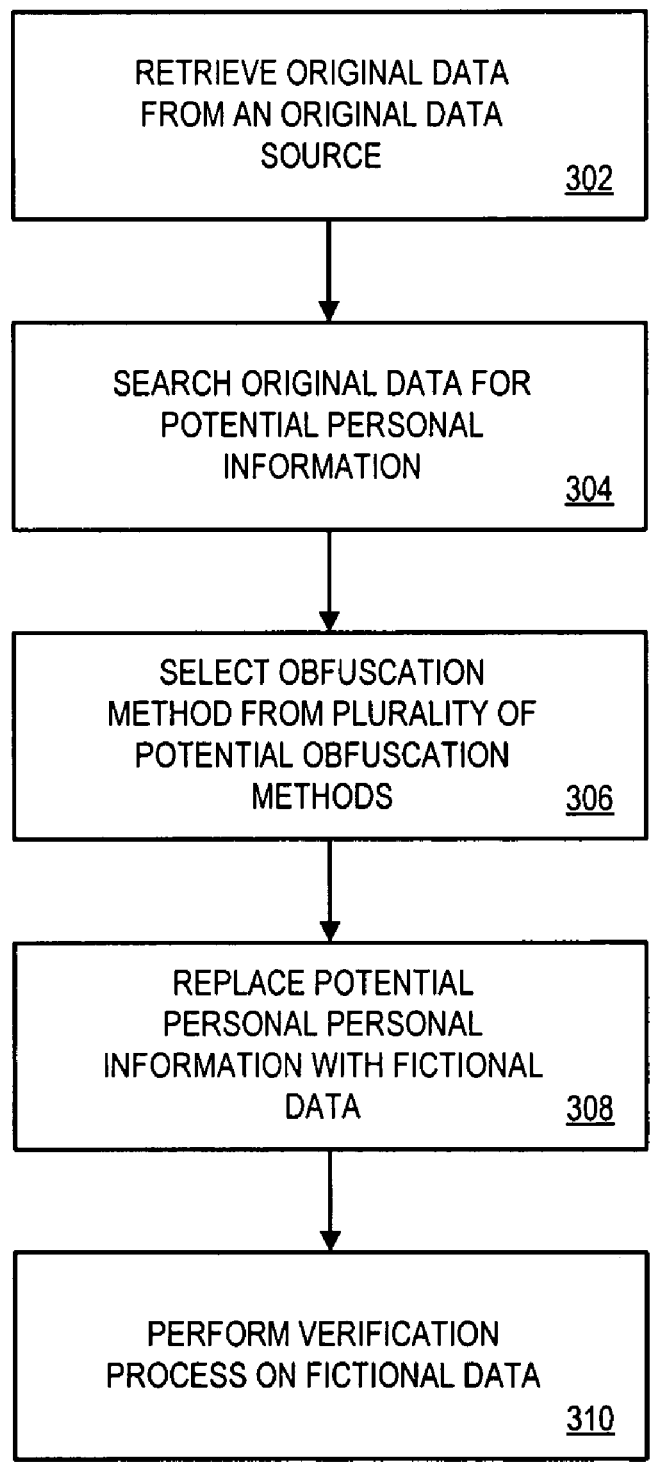
FIG. 3 illustrates a method according to some embodiments of the present invention.

FIG. 3 illustrates a method that might be performed by, for example, the data de-identification service engine 150 in the system 100 described with respect to FIG. 1 according to some embodiments. The flow charts described herein do not imply a fixed order to the steps, and embodiments of the present invention may be practiced in any order that is practicable. Note that any of the methods described herein may be performed by hardware, software, or any combination of these approaches. For example, a computer-readable storage medium may store thereon instructions that when executed by a machine result in performance according to any of the embodiments described herein.

At 302, original data is retrieved from one or more original data sources. For example, the original data may be received and/or copied from a remote database server in a production environment. At 304, the original data is "automatically" searched for potential personal information. As used herein, the term "automatically" indicates that at least some part of a step associated with a process or service is performed with little or no human intervention.

By way of example only, the potential "personal information" searched for at 304 might represent potential PII values or potential PHI values. Note that other types of information in addition to, or instead of PII and PHI values may be similarly processed. According to some embodiments, the potential personal information is associated with a name (e.g., of a person or company), a Social Security number, an address, a date of birth or death, a telephone number, or email address. Other types of personal information might be associated with financial information, such as credit, debit, and bank account numbers, a credit score, or prior payment history information. Still other types of personal information might be associated with medical information (e.g., a doctor name, medical device number, health plan account number, and/or text or coded values associated with a medical condition or treatment), insurance information (e.g., a policy number), employment information (including income information, an employee identifier, and/or military service status), a drivers license number, a passport number, a user name, Personal Identification Number (PIN) value, or password associated with a customer's account, a mother's maiden name, a vehicle identifier, or criminal history information. Other examples of personal information might be associated with geo-coding, map information, barcodes, pictures, magnetic scan codes, and/or survey information.

The automatic searching performed at 304 might be associated with, for example, a character search at the beginning of a field. Consider, for example, the original data source 200 table illustrated in FIG. 2. In this case, a data de-identification service might automatically search for field names that begin with "Name" to determine data that potentially includes personal information (e.g., Name 204). Similarly, the data de-identification service might automatically perform a character search within a field (e.g., to locate elements labeled as "First Name" or "Last Name"). Note that the system might examine a beginning of a field, an end of a field, and/or exclude, extract, and/or support "wild card" conditions associated with a field.

Another technique might involve automatically searching for a field length and/or a field pattern. For example, the data de-identification service might automatically look for nine digit numbers (as potentially containing a Social Security number). As another example, the data de-identification service might automatically look for values that match the character string "(nnn) nnn-nnnn"—where "n" represent any integer from 0 through 9—to identify potential telephone numbers. In any embodiments described herein, results from a search might be verified by a human operator (e.g., an employee of the enterprise) and/or cross-referenced with external sources. For example, a database of known zip codes might be compared to a five-digit numerical field. If eighty percent of the values in the original data source were found to be valid zip codes, the five-digit field might be flagged as containing potentially personal information. As another example, potential three-digit area codes might be compared to a reference table to determine whether or not a field contains valid telephone numbers. Note that a threshold percentage value (e.g., where an eighty percent match results in data being flagged) might be variable, defined by a user, and/or be automatically adjusted by the system. Moreover, different elements might be associated with different threshold percentage values.

Still another technique might employ user defined mapping information received via a Graphical User Interface (GUI). For example, a user might indicate via a GUI display that the third field in a particular data source contains personal information. Yet another technique might use historical search results associated with other data sources. For example, prior searches of other data sources might have found that a field labeled "FN" frequently contained personal information (e.g., a customer's first name).

Note that automatic search for potential personal information may utilize any type of information within, or about, the data source. For example, when the original data is associated with a spreadsheet or database (e.g., a multidimensional hypercube of business information), the automatic search performed at 304 might be based on schema information, table information, metadata, and/or summary data.

At 306, an obfuscation method is selected from a plurality of potential obfuscation methods. The obfuscation method may be used, for example, to de-identify potentially personal information. The plurality of potential obfuscation methods might include, for example, a random assignment to de-identify information in the original data source (e.g., random characters might replace actual characters or a random name might be selected to replace an actual customer name). Other types of obfuscation methods might include concatenation, truncation (e.g., replacing an actual telephone number with "(555) 555-nnnn" where "n" represents the actual integers of the customer's telephone number. Still other methods could include uniform replacement (all dates of birth are replaced with "Jan. 1, 2001" or increased or decreased by a number of days), hashing, and/or substitution of a value from a reference table (e.g., "New York" is always replaced with "Chicago"). In some other cases, information might be deleted, encoded, encrypted, randomized, scrambled, mixed, and/or shuffled. According to some embodiments, multiple obfuscation methods may be used to create "fictional" data. For example, a credit card number might be first scrambled and then truncated to create a fictional credit card number. Note that, as used herein, "fictional" data may refer to any type of information that is used to protect a person's personal information. By way of example only, fictional data might include actual names of other people (e.g., an actual name randomly selected from a public database). Moreover, is some cases fictional data is generated such that it is not possible to determine the original data from the fictional data.

Figure 4:
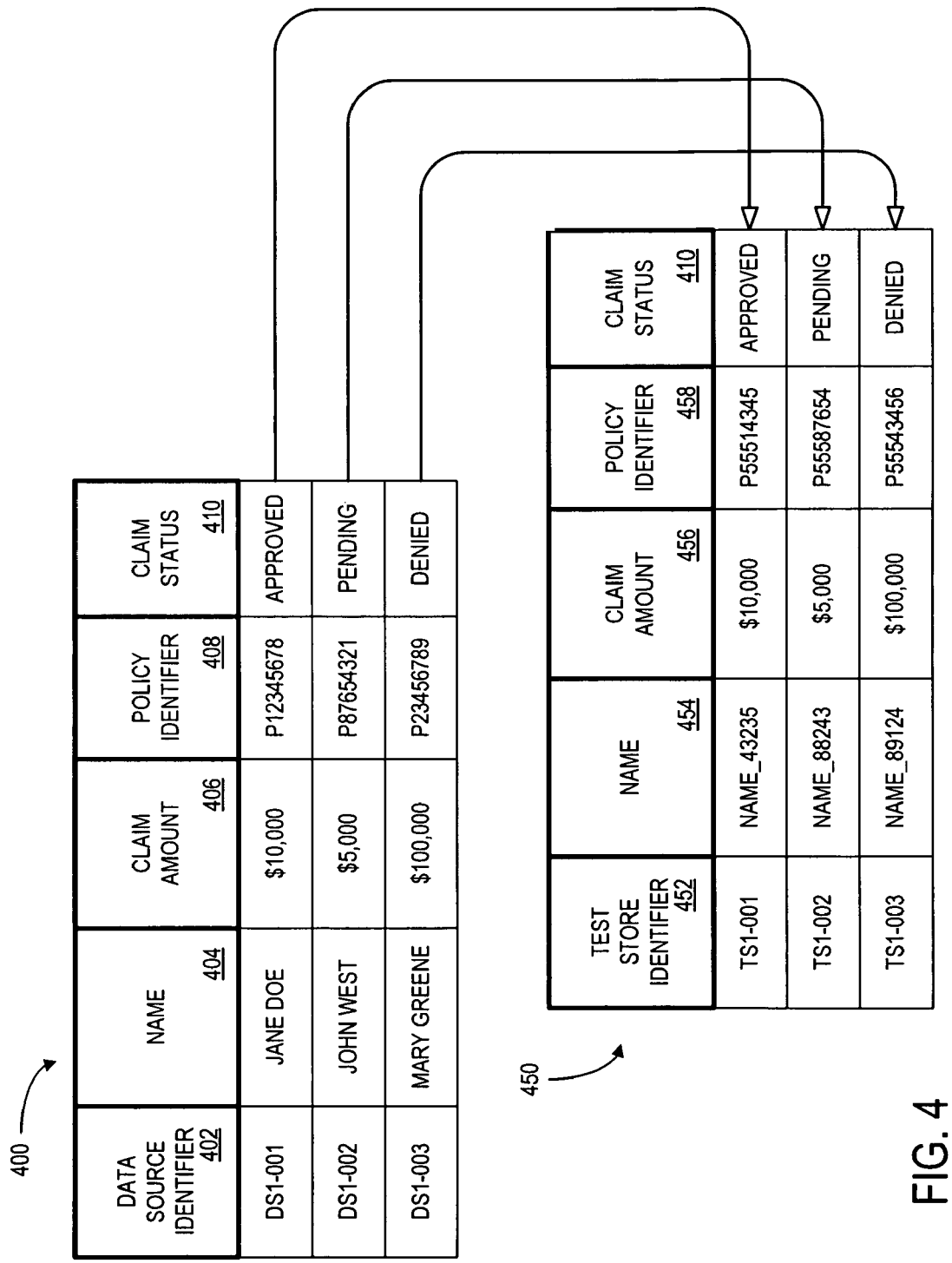
FIG. 4 illustrates the use of fictional data to replace information in an original data source in accordance with some embodiments of the present invention.

At 308, the potential personal information in the original data is automatically replaced with fictional data in accordance with the selected obfuscation method. For example, FIG. 4 illustrates the use of fictional data to replace information in an original data source 400 in accordance with some embodiments of the present invention. As before, the original data source 400 table illustrates entries associated with actual insurance claims that have been submitted to an enterprise. The table defines a data source identifier 402, a name 404, a claim amount 406, a policy identifier 408, and a claim status 410.

In this example, the name 404 and policy identifier 408 may have been automatically identified (e.g., at 304) as containing potential personal information. Thus, the automatic replacement performed at 308 might result in a test data store 450 as illustrate in FIG. 4. In a format similar to the one described with respect to the original data source 400, the test data store 450 defines a test store identifier 452, a name 454, a claim amount 456, a policy identifier 458, and a claim status 410. In this case, however, the name 454 and policy identifier 458 (which were flagged as potential personal information) do not include information directly copied from the original data store 400. Instead, the name 454 has been randomly assigned (e.g., "Name_43235") and the first three numeric digits of the policy identifier 458 have been fixed at "555." Note that the claim amount 456 and claim status 410 (which were not flagged as potential personal information) simply contain values copied from the original data store 400.

According to some embodiments, the automatic replacement performed at 308 includes creating database "scripts" to be used during a database refresh process. As used herein, a script may refer to, for example, instructions or programs that designed to execute on a database. When the scripts are executed, the original information will be replaced with fictional data as appropriate. Note that scripts might reside in a data de-identification service, a source system, and/or a target system. Moreover, scripts might be executed individually and/or in a "batch" mode. In some cases, a script might be generated and executed a single time to clean a database. In other embodiments, a script might be embedded such that it may be repeatedly executed as appropriate (e.g., on a periodic basis or when data has been added or changed).

According to still other embodiments, the data de-identification service will store information about the selected obfuscation methods and automatic replacement in connection with the original data. For example, the service might remember which fields contained personal information and which obfuscation methods were used for each of those fields. In this way, the server can later retrieve updated original data from the data source, and then automatically replace potential personal information in the updated original data with fictional data in accordance with the stored information about the selected obfuscation methods and automatic replacement (e.g., so that the replaced fields and the replacement techniques remain consistent when the data is updated).

According to some embodiments, the automatic replacement of original data with fictional data is based on a pre-defined user preference or default value. For example, the data de-identification service might receive a user preference from a user via a GUI display (e.g., he or she might select "always replace a credit card number with a randomly generate number" from the GUI display), and the automatic replacement may then be performed in accordance with the user preference.

According to other embodiments, the data de-identification service might evaluate an obfuscation rule, and the automatic replacement is then performed in accordance with a result of the evaluation. By way of example, the rule might indicate that if data matches the character string format "nnn-nn-nnnn" then last six numeric digits should be replaced with the number "5" (e.g., to generate "nnn-55-5555").

Referring again to FIG. 3, according to some embodiments fictional data may be verified at 310 after it is placed in a test data store. For example, a user might select a "Verify" icon via a GUI display to execute a verification process on the fictional data (e.g., to ensure that the data is formatted in an appropriate way and/or that personal information has not been mistakenly included in a test data store).

Figure 5:
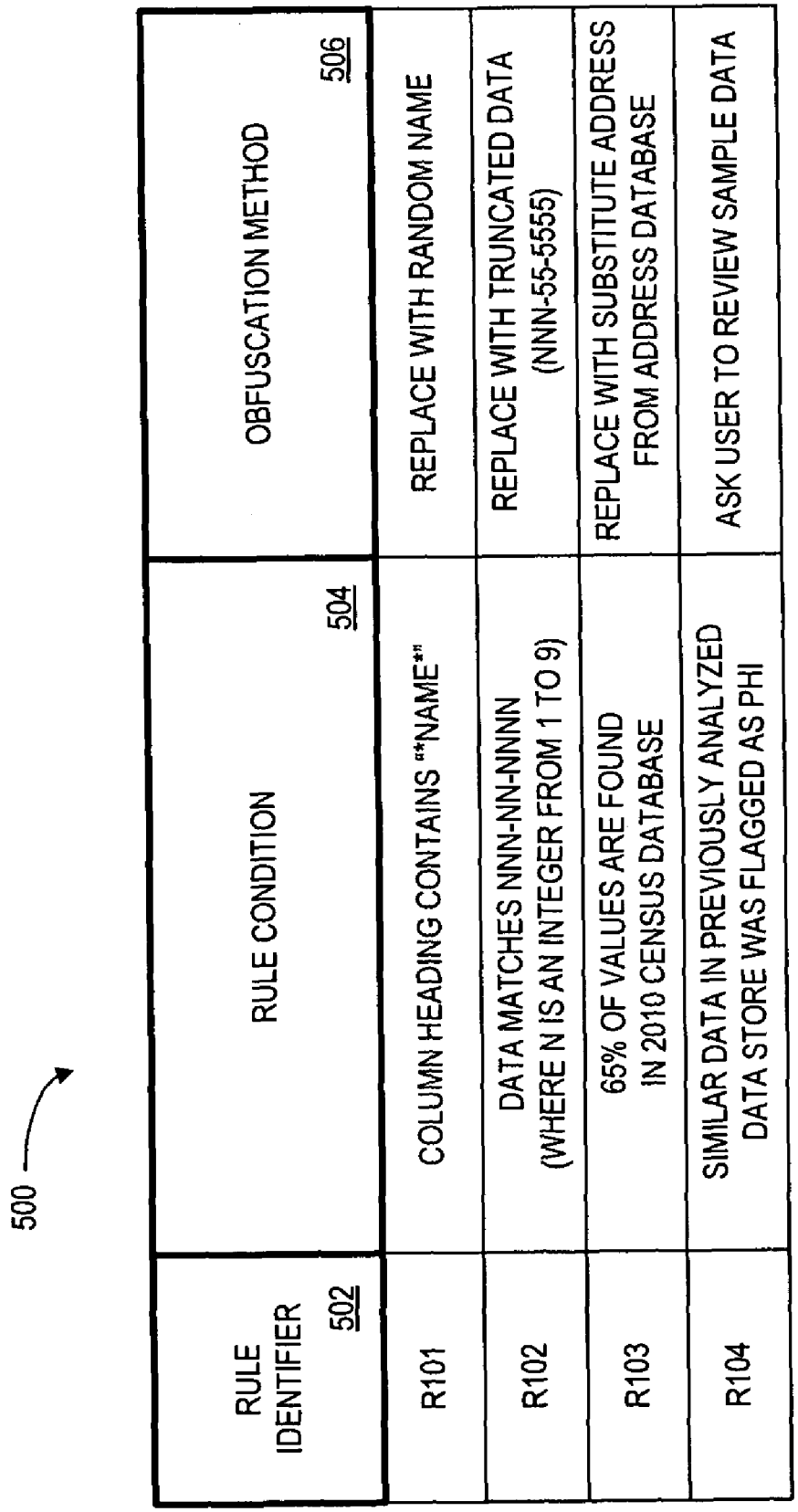
FIG. 5 is a tabular view of a portion of a rules database in accordance with some embodiments of the present invention.

These types of obfuscation rules could be conditioned on, for example, column headings, character patterns within the data, and/or external references. Moreover, the system, a user, or a system designer might define a way to recognize potential personal information and/or define how an obfuscation method should be selected. By way of example, FIG. 5 is a tabular view of a portion of a rules database 500 in accordance with some embodiments of the present invention. The table also defines fields 502, 504, 506 for each of the entries (that is, for each rule stored in the database 500). The fields specify: a rule identifier 502, a rule condition 504, and a obfuscation method 506. The information in the rules database 500 may be created and updated, for example, based on information received from a data de-identification service designer and/or a user via a GUI display. The rule identifier 502 may be, for example, an alphanumeric code associated with a particular data de-identification rule. The rule condition 504 might define when the rule is satisfied, and the obfuscation method 506 might indicate what should be done when it is determined that the rule condition 504 is satisfied for a particular column or element in an original data source.

Figure 6:
FIG. 6 is a tabular view of a portion of a reference database in accordance with some embodiments of the present invention.

FIG. 6 is a tabular view of a portion of a reference database 600 in accordance with some embodiments of the present invention. The table defines fields 602, 604, 606 for each of the entries that specify: a reference entry identifier 602, original information 604, and fictional replacement information 606. The information in the reference database 600 may be created and updated, for example, based on information received from a system designer and/or from publicly available records. By way of example only, the fictional replacement information 606 might include values or character strings that are to be substituted for particular items of original information 604 (e.g., "Jerry Westfield" might always replace "John Washington"). As another example, the fictional replacement information 606 might comprise a list of predetermined values or character strings (e.g., a set of credit card numbers that are known to be invalid) that will be substituted for the original information 604. As other examples, the fictional replacement information 606 might be randomly generated in accordance with one or more rules (e.g., rules such that a randomly generated Social Security number is guaranteed to not be assigned to an actual person) and/or be associated with a publicly available database.

Figure 7:
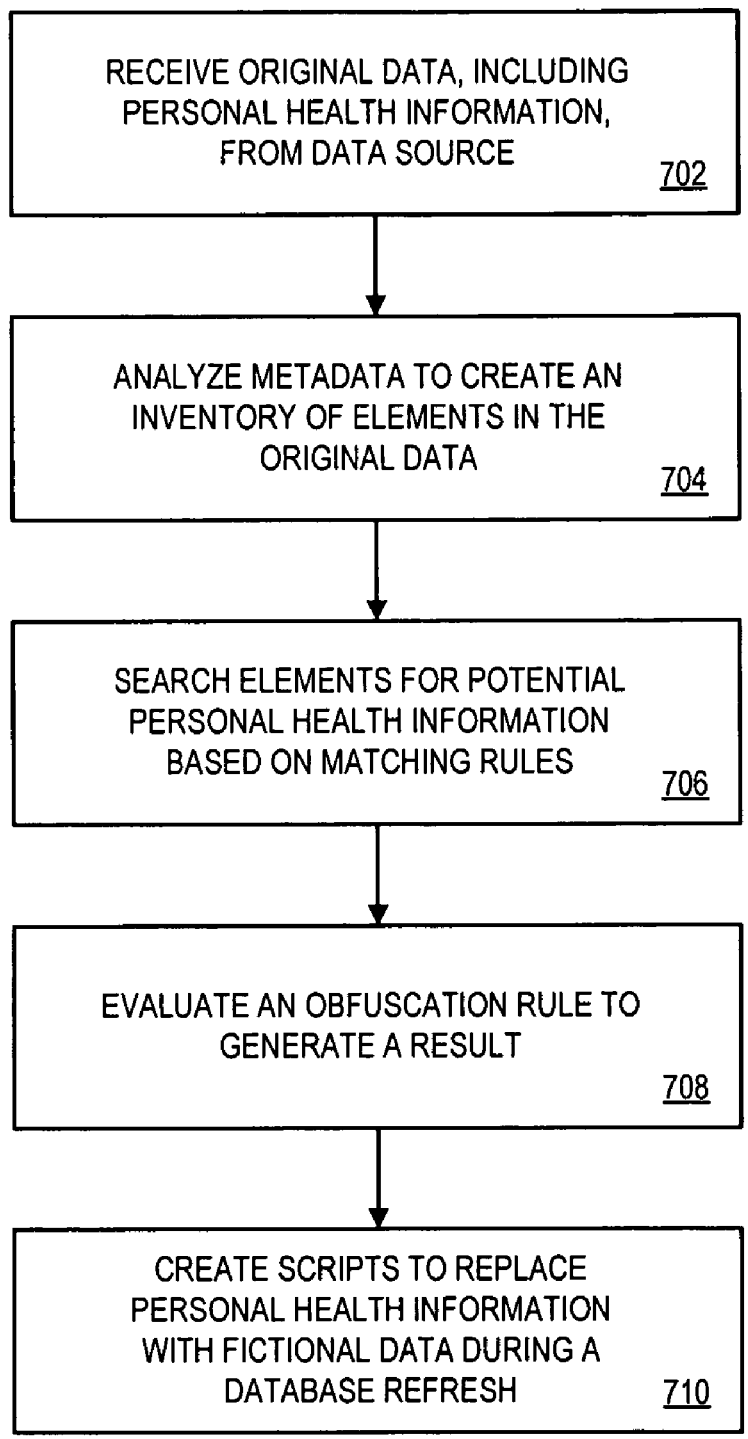
FIG. 7 illustrates another method according to some embodiments of the present invention.

FIG. 7 illustrates another method according to some embodiments of the present invention. At 702, original data is received from a data store. Metadata data and/or summary data associated with the original data is analyzed to create an inventory of elements in the original data at 704, and elements in the inventory are searched for potential personal information based on at least one character matching rule at 706. A character matching rule might be associated with, for example, a number of characters in a string or other data factors (e.g., a size, type, and/or length of data).

An obfuscation rule is evaluated at 708, and scripts are automatically created at 610. The scripts may be used, for example, during a database refresh process to replace the potential personal information in the original data with fictional data in accordance with (i) a result of the evaluation at 708 and (ii) an obfuscation method selected from a set of potential obfuscation methods. According to some embodiments, a validation of the obfuscated data is also performed using scripts, rules, and/or inventory information.

A user (e.g., an employee of an enterprise who is to create a test data store to be accessed by an application design team) might interact with a data de-identification service in a number of different ways. For example, a user may simply provide a link, filename path, or pointer associated with the original data source and receive back a test data store with the potential personal information already removed. According to some embodiments, the user may also interact with the service during the data de-identification process. For example, FIGS. 8 through 12 illustrate GUI displays that may be associated with a data de-identification service in accordance with an exemplary embodiment of the present invention.

Figure 8:
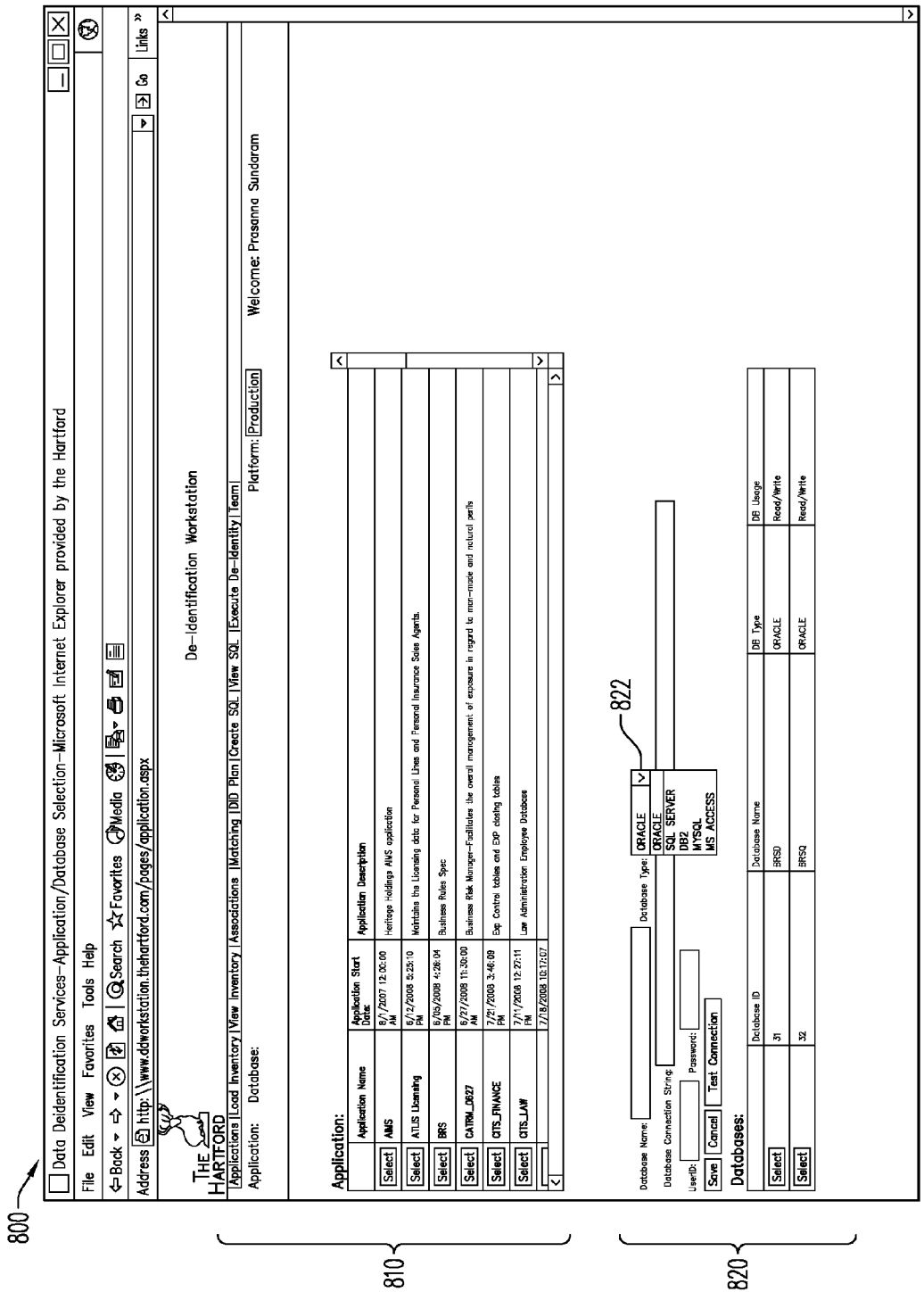

FIG. 8 illustrates a GUI display 800 that may be associated with the addition of new applications and/or original data sources for a data de-identification service. For example, the display 800 might include a first area 810 that provides information about one or more applications and a second area 820 that provides information about one or more database for a selected application. The display 800 may further provided a database type selection 822 drop-down menu that lets the user assign a particular type to a selected database (e.g., an ORACLE or MYSQL database type).

Figure 9:
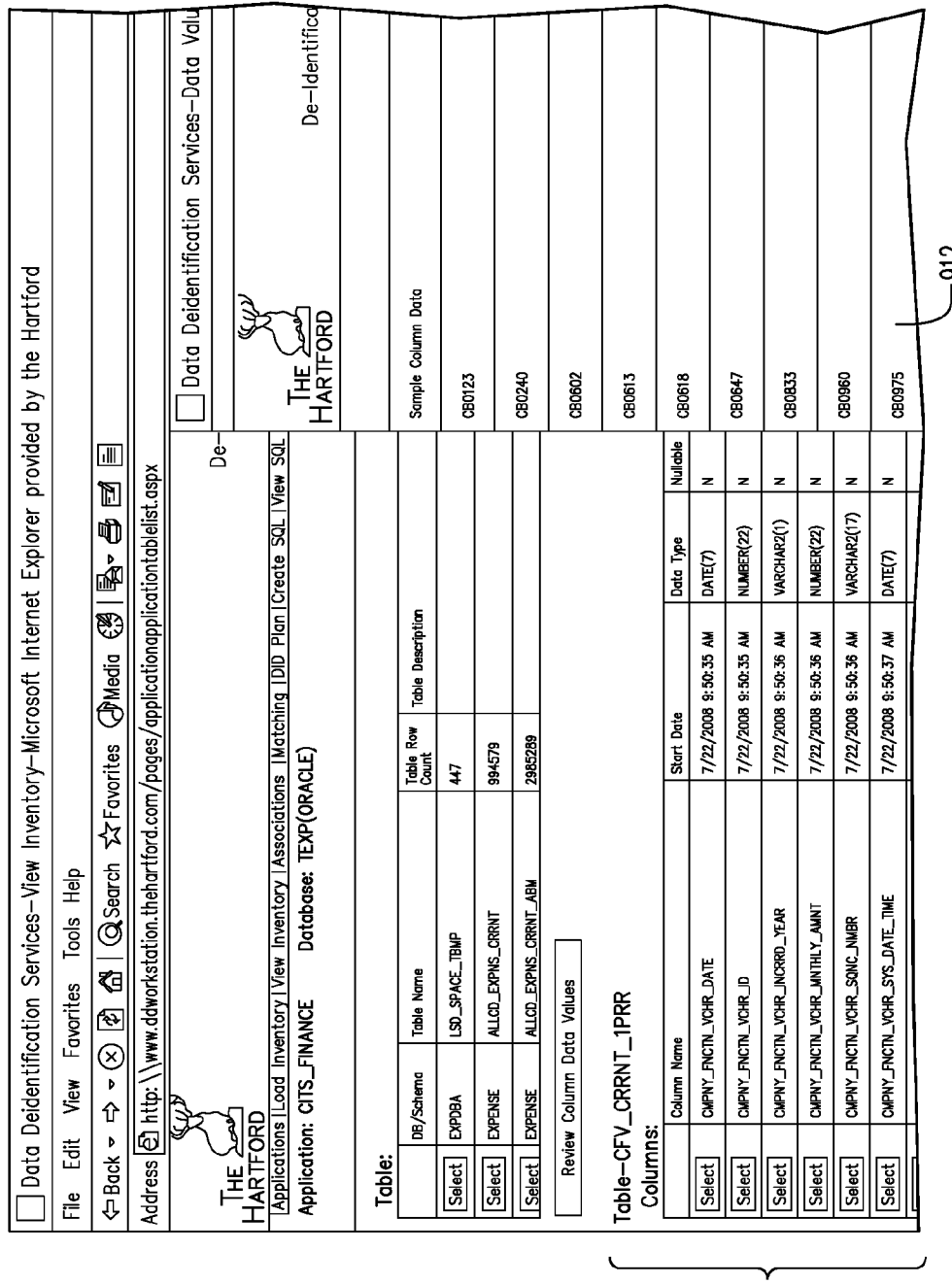

Once the appropriate applications and associated databases have been defined, the user might be interested in viewing information about elements within a particular database. For example, FIG. 9 illustrates a GUI display 900 that may be used to examine inventory information about elements within a particular application's database. In particular, an area 910 provides column information (e.g., a column name and data type) about elements in that database. The display 900 may further provide sample column data 912 associated with an element selected by the user. According to some embodiments, the user may correct information (e.g., by correct a column data type) via the display 900.

Figure 10:
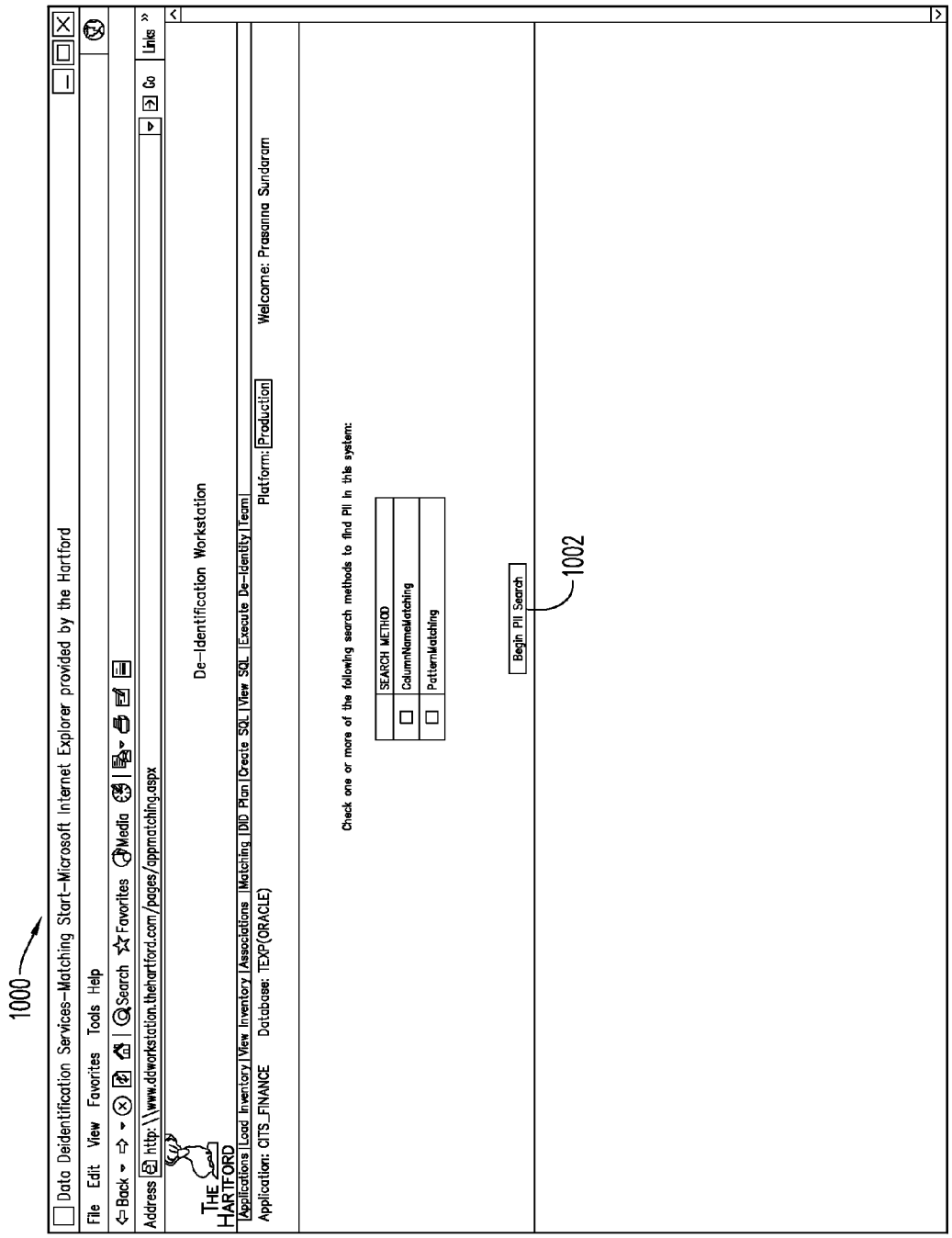
Figure 11:
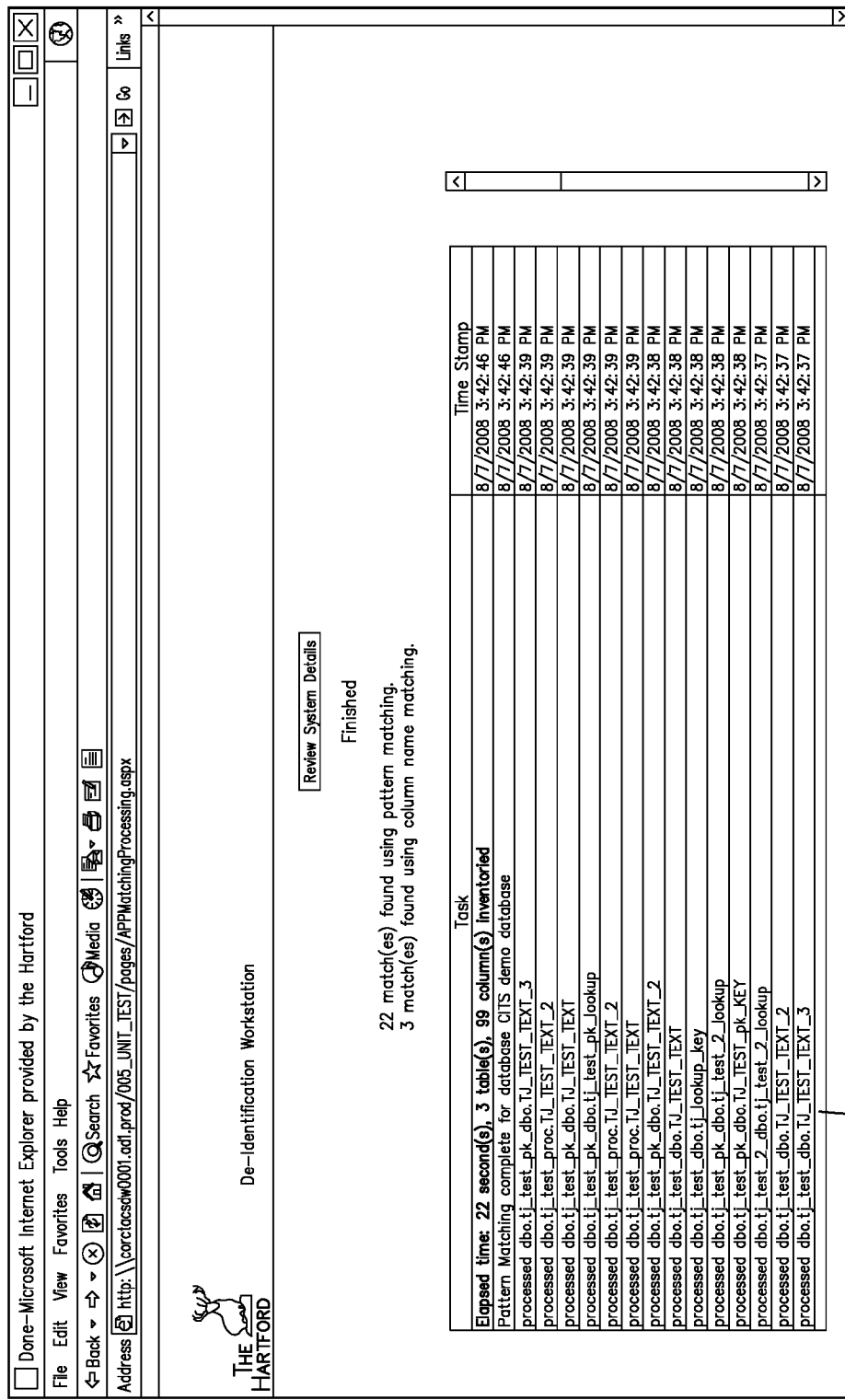

After the database information is reviewed, the user may initiate an automatic search for potential personal information within the database. For example, FIG. 10 illustrates a GUI display 1000 that includes an icon 1002 that can initiate a search for potential personal information (e.g., for potential PII values or other types of personal information). According to some embodiments, the user may also customize the automatic search via the display 1000 (e.g., by selecting pattern and/or column name matching techniques). Another GUI display 1100, such as the one illustrated in FIG. 11 may then provide a result 1102 to the user (e.g., indicating that 22 potential matches have been automatically located using a pattern matching search and 3 potential matches have been automatically located using a column name matching search).

Figure 12:
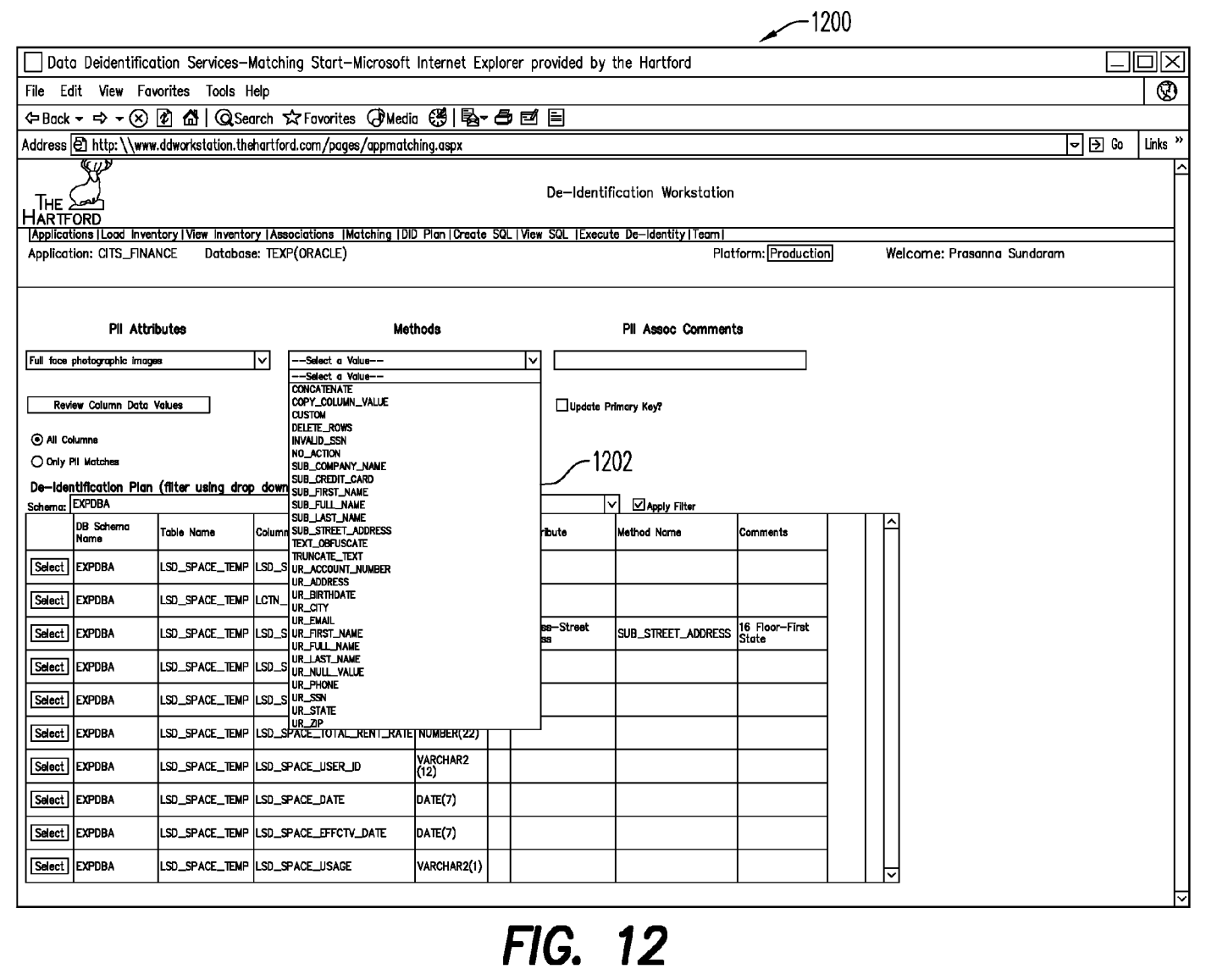

When potential personal information within a database has been automatically flagged, the user may, according to some embodiments, assign an obfuscation method to the database (or to elements within the database). For example, FIG. 12 illustrates a GUI display 1200 that might list potential PII matches for the user. The display 1200 includes an obfuscation method selection 1202 drop-down menu that lets the user assign a particular method for each match (e.g., instructing the data de-identification service to replace a value with an "Invalid_SSN" or a "Sub_Last_Name").

Upon assignment of appropriate obfuscation methods for each element of potential personal information, the user may initiate, for example, generation of an appropriate database script to de-identify information in the database. That is, when the script is executed, the personal information will be replaced with fictional data as appropriate in view of the assigned obfuscation method.

Figure 13:
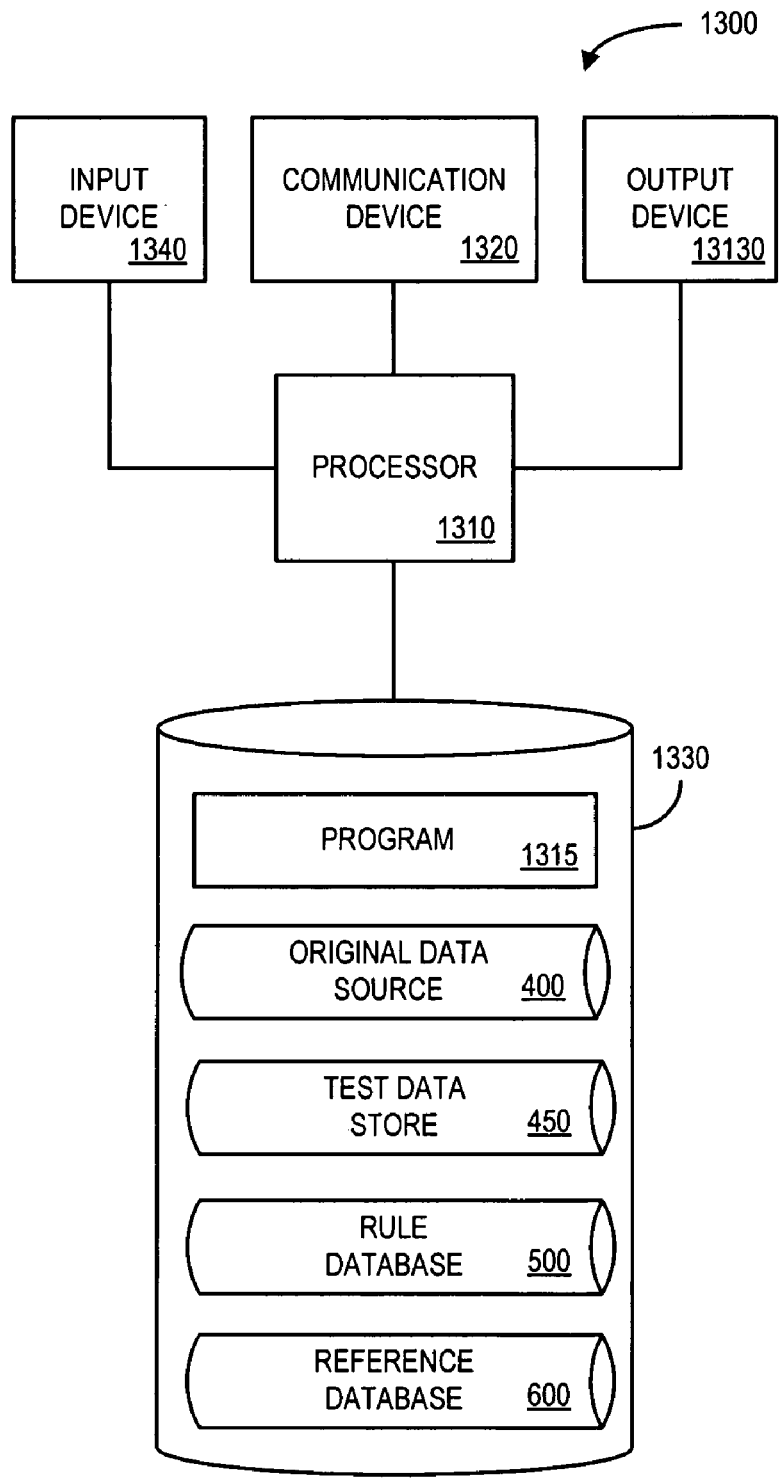
FIG. 13 illustrates a data de-identification service engine in accordance with an exemplary embodiment of the invention.

FIG. 13 illustrates a data de-identification service platform or engine 1300 that might be descriptive, for example, of the engine 150 illustrated in FIG. 1 in accordance with an exemplary embodiment of the invention. The data de-identification service engine 1300 comprises a processor 1310, such as one or more INTEL® Pentium® processors, coupled to a communication device 1320 configured to communicate via a communication network (not shown in FIG. 13). The communication device 1320 may be used to communicate, for example, with one or more remote original data sources 130, test data stores 132, and/or user workstations.

The processor 1310 is also in communication with an input device 1340. The input device 1340 may comprise, for example, a keyboard, a mouse, or computer media reader. Such an input device 1340 may be used, for example, to enter information about applications, databases, potential personal information, and/or obfuscation methods. The processor 1310 is also in communication with an output device 1350. The output device 1350 may comprise, for example, a display screen or printer. Such an output device 1350 may be used, for example, to provide reports and/or display information associated with applications, databases, and database elements.

The processor 1310 is also in communication with a storage device 1330. The storage device 1330 may comprise any appropriate information storage device, including combinations of magnetic storage devices (e.g., magnetic tape and hard disk drives), optical storage devices, and/or semiconductor memory devices such as Random Access Memory (RAM) devices and Read Only Memory (ROM) devices.

The storage device 1330 stores a program 1315 for controlling the processor 1310. The processor 1310 performs instructions of the program 1315, and thereby operates in accordance any embodiments of the present invention described herein. For example, the processor 1310 may receive, via the communication device 1320, original data from a data source. The processor 1310 may also automatically create an inventory of elements in the original data, and search the elements in the inventory for potential personal information (or any other type of information of interest). According to some embodiments, the processor 1310 facilitates a selection of an obfuscation method (e.g., from a plurality of potential obfuscation methods) and automatically replaces the potential personal information in the original data with fictional data in accordance with the selected obfuscation method. The processor 1310 may also transmit information associated with the original data, where the potential personal information has been replaced with the fictional data, to a remote device via the communication device 1320.

As used herein, information may be "received" by or "transmitted" to, for example: (i) the data de-identification service engine 1300 from original data sources 130, test data stores 132, and/or user workstations; or (ii) a software application or module within the data de-identification service engine 1300 from another software application, module, or any other source.

As shown in FIG. 13, the storage device 1330 also stores: an original data source 400 (described with respect to FIG. 4); a test data store 450 (also described with respect to FIG. 4); a rules database 500 (described with respect to FIG. 5); and a reference database 600 (described with respect to FIG. 6). Note that the illustrations and accompanying descriptions of the data sources, stores, and/or databases presented herein are exemplary, and any number of other arrangements could be employed besides those suggested by the figures.

Although some examples are described herein as being associated with a single original data source and a single test data store, embodiments may involve a plurality of either. For example, in some cases a production environment application will access two original data stores. Moreover, both data stores might store a particular data element, including a data element containing personal information (e.g., a customer's name might be stored in both). In this case, it might be important that the same fictional data be used to replace personal information in both cases. For example, a test application may need to correlate information from two different test data stores based on the fictional version of the personal information.

Figure 14:
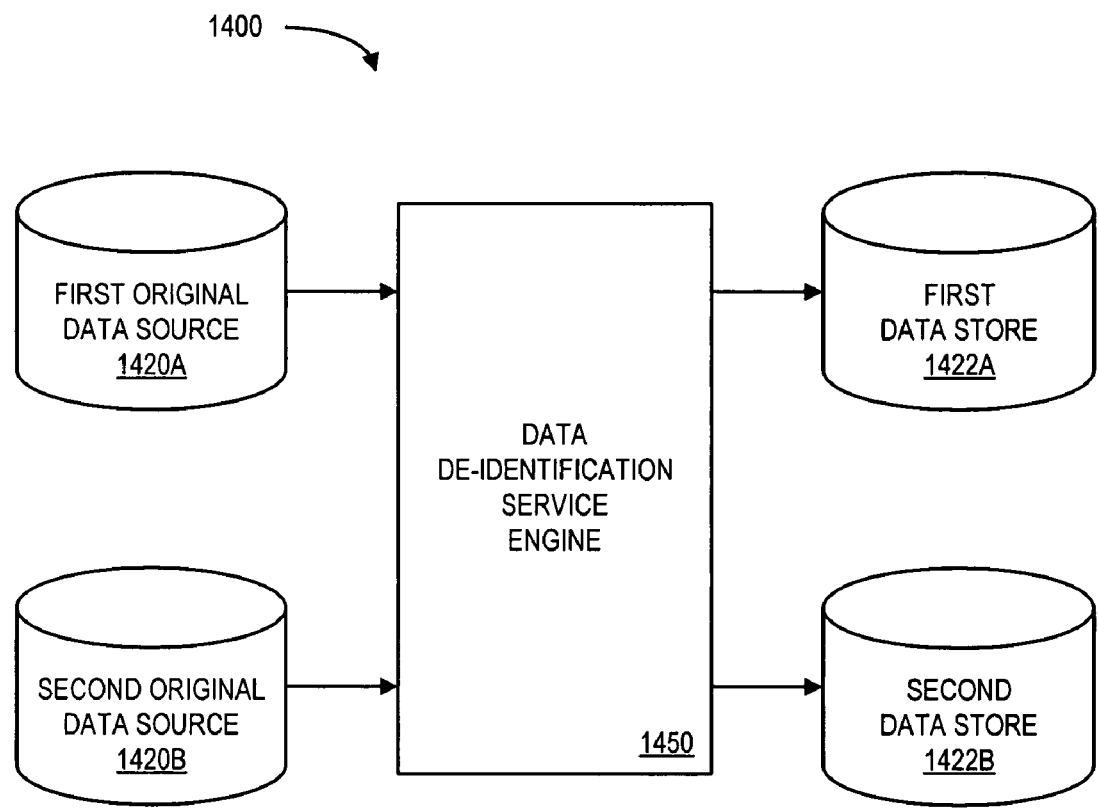
FIG. 14 illustrates multiple data sources and/or data stores in accordance with some embodiments of the present invention.

FIG. 14 illustrates multiple data sources and/or data stores in accordance with some embodiments of the present invention. In this case, a data de-identification service engine 1450 may retrieve information from both a first original data source 1420A and a second original data source 1420B. In some cases, the data de-identification service engine 1450 may retrieve primary information from the first original data source 1420A and supplemental information from the second original data source 1420B. Based on the retrieved information, the data de-identification service engine 1450 creates "clean" versions (without personal information) as a first data store 1422A and a second data store 1422B.

Moreover, the data de-identification service engine 1450 may automatically replace potential personal information in the supplemental data with fictional data, wherein if a first value in the first original data source 1420A was replaced with a second value, then that same first value in the supplemental data (e.g., the second original data source 1420B) would also be replaced with that same second value. In this way, a test application can access both the first data store 1422A and the second data store 1422B and identical elements in both stores will still have identical (but fictional) values. According to some embodiments, such an approach may provide "referential integrity" (e.g., consistency between coupled tables).

According to some embodiments, a single original data source may be used to create two, related data stores. Similarly, according to other embodiments, two, related original data sources may be used to create a single data store.

Thus, in accordance with the various embodiments described herein, a system may be provided that generates de-identified data with an increased level of automation, accuracy, and efficiency. Note that such techniques and automation may lower application development costs and these savings might be shared by all parties (e.g., the enterprise and the customers of the enterprise). Moreover, the privacy of the customers may be enhanced.

The following illustrates various additional embodiments of the invention. These do not constitute a definition of all possible embodiments, and those skilled in the art will understand that the present invention is applicable to many other embodiments. Further, although the following embodiments are briefly described for clarity, those skilled in the art will understand how to make any changes, if necessary, to the above-described apparatus and methods to accommodate these and other embodiments and applications.

Although specific hardware and data structure configurations have been described herein, note that any number of other configurations may be provided in accordance with embodiments of the present invention (e.g., some of the information associated with the databases described herein may be combined or stored in external systems).

Similarly, although specific methods of obfuscation have been described herein, any number of other methods may be employed in addition to, or instead of, those methods. For example, various techniques of data encoding and/or encryption might be used to create fictional data replacement values for personal information. Moreover, although some examples have been described as being related to insurance transactions, any embodiments of the present invention might be useful in other environments—including those associated with financial information and/or medical information.

In addition, embodiments of the present invention might be associated with types of information other than "personal" information. For example, information about a business (e.g., actual sales figures) might be modified to create a database to be used in a test environment. Moreover, in some cases fictitious data might not be used at all. For example, a system might simply analyze a database to determine whether or not it contains personal information (or to indicate how much personal information resides within a data store).

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed:

1. A data de-identification system, comprising:
an original data source;
a processor coupled to the original data source; and a storage device in communication with said processor and storing instructions adapted to be executed by said processor to:
  retrieve original data from the original data source;
  automatically search the original data for potential personal information, wherein the automatic search is performed using historical search results associated with data sources other than the original data source;
  automatically evaluate a plurality of potential obfuscation methods, based on the potential personal information in the original data source, to generate an evaluation result;
  automatically select, in accordance with the evaluation result, an obfuscation method from the plurality of potential obfuscation methods; and
  automatically replace the potential personal information in the original data with fictional data in accordance with the selected obfuscation method.

2. The data de-identification system of claim 1, wherein the potential personal information includes a first element of a first data type and a second element of a second data type, different than the first data type, and further wherein a first obfuscation method is automatically selected for the first element based on a potential personal information character pattern associated with the first data type and a second obfuscation method, different than the first method, is automatically selected for the second element based on a potential personal information character pattern associated with the second data type.

3. The data de-identification system of claim 1, wherein the potential personal information includes at least one of: (i) potential personally identifiable information, or (ii) potential personal health information.

4. The data de-identification system of claim 1, wherein the potential personal information is associated with at least one of: (i) a name, (ii) a Social Security number, (iii) an address, (iv) a date of birth or death, (v) a telephone number, (vi) medical information, (vii) a credit card number, (viii) financial account information, (ix) a policy number, (x) a drivers license number, (xi) a passport number, (xii) employment information, (xiii) a user name or password, (xiv) income information, (xv) credit information, (xvi) a mother's maiden name, (xvii) a vehicle identifier, (xviii) a medical device identifier, (xix) criminal history information, (xx) an email address, (xxi) map information, or (xxii) survey information.

5. The data de-identification system of claim 1, wherein said automatic searching is associated with at least one of: (i) a character search at the beginning of a field, (ii) a character search within a field, (iii) a field length, (iv) a field pattern, (v) user mapping information received via a graphical user interface, or (vi) historical search results associated with other data sources.

6. The data de-identification system of claim 1, wherein the original data is associated with a database and said automatic searching includes identifying elements based on at least one of: (i) schema information, (ii) table information, or (iii) column information.

7. The data de-identification system of claim 1, wherein the original data is associated with a data store and said automatic searching includes creating an inventory of elements by extracting information based on at least one of: (i) metadata, or (ii) summary data of the data store.

8. The data de-identification system of claim 1, wherein said automatic replacement comprises creating scripts to be used during a database refresh process.

9. The data de-identification system of claim 1, wherein the plurality of potential obfuscation methods includes at least one of: (i) random assignment, (ii) concatenation, (iii) truncation, (iv) uniform replacement, or (v) substitution of a value from a reference table.

10. The data de-identification system of claim 1, wherein said instructions are further adapted to be executed by said processor to:
  store information about the selected obfuscation methods and automatic replacement in connection with the original data;
  retrieve updated original data from the data source; and
  automatically replace potential personal information in the updated original data with fictional data in accordance with the stored information about the selected obfuscation methods and automatic replacement.

11. The data de-identification system of claim 1, wherein said instructions are further adapted to be executed by said processor to:
  receive a user preference from a user via a graphical user interface able to associate a selection of a personally identifiable information attribute from a first drop down menu with a data de-identification method from a second drop down menu, wherein said automatic replacement is performed in accordance with the received user preference.

12. The data de-identification system of claim 1, wherein said instructions are further adapted to be executed by said processor to:
  retrieve supplemental data from a supplemental data source;
  automatically detect that a first potential personal information value in the supplemental data source is correlated with a first potential personal information value in the original data source;
  automatically retrieve a second potential personal information value that was previously used to replace the first potential personal information value in the original data source; and
  automatically replace the first potential personal information value in the supplemental data source with that same second potential personal information value to provide referential integrity.

13. The data de-identification system of claim 1, further comprising:
  a communication device, coupled to the processor, to transmit information via a communication network, wherein said instructions are further adapted to be executed by said processor to:
    transmit information associated with the original data, where the potential personal information has been replaced with the fictional data, to a remote device via the communication device.

14. A computer-implemented method, comprising:
  receiving original data from a data source;
  automatically creating an inventory of elements in the original data;
  automatically searching the elements in the inventory for potential personal information, wherein the automatic search is performed using historical search results associated with data sources other than the original data source;
  automatically evaluating a plurality of potential obfuscation methods, based on the potential personal information in the original data source, to generate an evaluation result;
  automatically selecting, in accordance with the evaluation result, an obfuscation method from the plurality of potential obfuscation methods; and automatically replacing the potential personal information in the original data with fictional data in accordance with the selected obfuscation method.

15. The computer-implemented method of claim 14, wherein the potential personal information includes at least one of: (i) potential personally identifiable information, or (ii) potential personal health information.

16. The computer-implemented method of claim 14, wherein the potential personal information is associated with at least one of: (i) a name, (ii) a Social Security number, (iii) an address, (iv) a date of birth or death, (v) a telephone number, (vi) medical information, (vii) a credit card number, (viii) financial account information, (ix) a policy number, (x) a drivers license number, (xi) a passport number, (xii) employment information, (xiii) a user name or password, (xiv) income information, (xv) credit information, (xvi) a mother's maiden name, (xvii) a vehicle identifier, (xviii) a medical device identifier, (xix) criminal history information, (xx) an email address, (xxi) map information, or (xxii) survey information.

17. The computer-implemented method of claim 14, wherein said creating or searching is associated with at least one of: (i) a character search at the beginning of a field, (ii) a character search within a field, (iii) a field length, (iv) a field pattern, (v) user mapping information received via a graphical user interface, or (vi) historical search results associated with other data sources.

18. The computer-implemented method of claim 14, wherein the original data is associated with a database and said creating or searching includes identifying elements based on at least one of: (i) schema information, (ii) table information, or (iii) column information.

19. The computer-implemented method of claim 14, wherein the original data is associated with a data store and said creating or searching includes creating an inventory of elements by extracting information based on at least one of: (i) metadata, or (ii) summary data of the data store.

20. The computer-implemented method of claim 14, wherein said automatic replacement comprises creating scripts to be used during a database refresh process.

21. The computer-implemented method of claim 14, wherein the plurality of potential obfuscation methods includes at least one of: (i) random assignment, (ii) concatenation, (iii) truncation, (iv) uniform replacement, or (v) substitution of a value from a reference table.

22. The computer-implemented method of claim 21, further comprising:
retrieving supplemental data from a supplemental data source;
automatically detecting that a potential personal information first value in the supplemental data source is correlated with a first potential personal information value in the original data source;
automatically retrieving a second potential personal information value that was previously used to replace the first potential personal information value in the original data source; and
automatically replacing the first potential personal information value in the supplemental data source with that same second potential personal information value to provide referential integrity.

23. A computer-readable medium storing instructions adapted to be executed by a processor to perform a data de-identification method, said method comprising:
receiving original data from memory;
analyzing metadata data associated with the original data to create an inventory of elements in the original data;
searching elements in the inventory for potential personal information based on at least one character matching rule automatically generated from historical search results associated with data sources other than the original data;
evaluating an obfuscation rule to generate an evaluation result, wherein the evaluation is based on the potential personal information in the original data;
automatically creating scripts to be used during a database refresh process to replace the potential personal information in the original data with fictional data in accordance with an obfuscation method selected, in accordance with the evaluation result, from a set of potential obfuscation methods;
transforming the original data by executing the automatically created scripts; and
transmitting the transformed original data to a remote device via a communication network.

* * * * *